United States Patent Office 3,657,444
Patented Apr. 18, 1972

3,657,444
METHODS OF COMBATING NEMATODES IN THE SOIL
Martin Jacob Handele, Johannes Kuipers, and Kobus Wellinga, Weesp, Netherlands, assignors to U.S. Philips Corporation, New York, N.Y.
No Drawing. Filed Feb. 14, 1966, Ser. No. 527,096
Claims priority, application Netherlands, Feb. 18, 1965, 6502006
Int. Cl. A01n 9/22
U.S. Cl. 424—274
9 Claims

ABSTRACT OF THE DISCLOSURE

Compounds of the 4-halo-pyridine or the 4-halo-pyridine-N-oxide class and salts thereof as nematocides.

---

It is known that substituted N-oxides of heterocyclic nitrogen containing compounds of the formula:

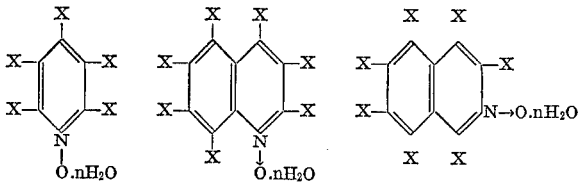

in which formulae $n$ has the value 0 or 1 or 2 and X is hydrogen, chlorine, bromine, nitro, alkyl, alkoxy with 1–4 carbon atoms or aralkoxy with 7 to 10 carbon atoms, have been proposed as substances to repel birds and rodents. (U.S.P.S. 3,044,930).

The substances belonging to the said group of compounds can be processed into various types of compositions. For example, solutions in acetone, deodorized kerosene or naphthas have been proposed. In addition, aqueous emulsions have been proposed by using a suitable emulsifier. It has also been proposed to mix the compounds with solid carriers, for example, soil, sand, seeds, cereals and in general adsorbing substances.

The compounds may be used for the end in view by providing a quantity of the active compound of 0.5 to 100 g. per 83.6 m.² at places frequented by birds and rodents, for example, by atomizing, spraying or brushing the above-described compositions on the surfaces frequented by the animals.

Among the compounds specifically mentioned by name 4 chloro-pyridine N-oxide is included.

Applicants have found that 4-halogen-pyridines, the salts thereof and 4-halogen-pyridine-N-oxides and the salts thereof are active against plant-parasitic nematodes occurring in the soil can be inactivated by means of compositions produced on the basis of the said compound, so that they can exert little or no damage to vegetation.

It has been found that of the said 4-halogen compounds in particular the 4-bromo and the 4-chloro compounds are active, for example, 4-chloro-pyridine-N-oxide, 4-bromo-pyridine salt, 4-chloro-pyridine salt and 4-bromo-pyridine-N-oxide. This applies particularly to the 4-chloro compounds, notably 4-chloro-pyridine-N-oxide, which compound showed the greatest activity of the tested substances. Of the salts may be mentioned: the hydrochloric, sulphuric, nitric or phosphoric acid salt, in particular the hydrochloric acid salts of the above mentioned compounds.

The compounds have proved to be particularly active against parasitic nematodes, inter alia Meloidogyne and Heterodera species. The combatment of Melodogyne nematodes is of particular importance because the organisms of this species cause damage to a very great number of host plants. Of these may be mentioned: cotton, tobacco, paprika, tomato, flower vegetation, fruit trees (notably citrus) furthermore grapes, tea, hemp, soya, sugar beets and olives.

Of the Heterodera species may be mentioned H.schachtii which causes much damage to sugar beets and the H.rostochiensis which is responsible for the so-called potato blight. In addition may be mentioned H.avenae a nematode which occurs in oats cultures.

The 4-chloro-pyridine-N-oxide is further active against other plant parasitic nematodes for example Pratylenchus and Rotylenchus species. These species also occur very universally and cause great damage. The following species cause damage to the vegetation mentioned with it:

Pratylenchus penetrans: peach, cherry, apple, potato, oats rice, barley, maize;
Prat. brachynrus: cotton, maize, tobacco, strawberry.
Prat. coffeae: coffee, banana, cabbage, toamto, pea, bean.
Prat. vulnus: fruit trees, grape, currant plants.
Prat. zeae: maize, incidentally tobacco.
Prat. thronei: cereals, maize.
Rotylenchus uniformis: cereals, pea, carrot, beet, clover, strawberry, shrubs.

Of the above-mentioned pyridine derivatives, the 4-chloropyridine-N-oxide in particular has proved to be very active.

4-chloro-pyridine-N-oxide in particular has a preventive influence on the formation of plant damage by nematodes.

It is therefore of importance to treat soil with 4-chloropyridine-N-oxide before planting or sowing. In most of the cases a waiting period of from 5 to 14 days is sufficient. In some cases the treatment of the soil may take place simultaneously with or following the planting of parts of plants in the soil. This will be the case in particular when the parts of plants were already protected in a different manner against infestation by nematodes to a certain extent, or when the parts of plants are damaged by nematodes only at a later stage of development. In this case the sowing of seed which was or was not disinfected is to be considered in particular.

In addition it was found that 4-chloro-pyridine-N-oxide is active against the ovum stage of Meloidogyne in their natural surroundings which, on application of the composition, results in a strong reduction of the nematodes population in the soil.

One of the advantages of 4-chloro-pyridine-N-oxide is that the substance is only slightly phytotoxic both with regards to the above-soil parts and the sub-soil parts of the plants. It was found inter alia that no or very little damage to newly formed leaves or salad and tomato was found.

The effects according to the invention can be reached in a comparatively low dose preferably 10 to 80 kgs. per ha. For example, the optimum dosage for activity of 4-chloro-pyridine N-oxide in the experiments performed lies between 10 and 80 kgs. per ha.

The substance may be added to the soil in the usual formulations, that is to say as a solution of the substance in water, mineral oil, if required mixed with a water-miscible solvent, for example, a lower aliphatic alcohol. In addition, the substance may be processed to solid granular carriers. Various types of carriers may be employed, for example, porous granules (attaclay or pumice), mineral non-porous granules (for example sand, ground marl), organic granules (for example, coffee grounds, stems of tobacco leaves) or granules which may be compressed by the user himself, by means of powdered minerals and/or organic substances. Other possibilities are: invert emulsion, miscible oil, paste, wettable powder, water-soluble powder, dust or aerosols.

Below a dispensing prescription is given which may be followed for the production of these formulations. In the descriptions thereof, the expression "active substance" always means 4-chloro-pyridine N-oxide. These dispensing prescriptions may also be used, however, for other 4-halogeno pyridines, if required the N-oxides thereof, or the salts of these compounds, for example, 4-bromo-pyridine-N-oxide, 4-bromo-pyridine or 4 chloro-pyridine, HCl-salt.

FORMULATIONS (1) The active substance was dissolved in water, to which an emulsifier was also added. In a dosage of 40 kgs. of active substance per ha., dissolved in 50 m.³ of water, the surface tension of the said solution was approximately 40 dynes cm. This formulation gave the most homogeneous distribution of the active substance over the soil.

| Composition: | Percent |
| --- | --- |
| Active substance | 45.0 |
| Emulsifier spreader (alkylarylpolyglycol ether) | 1.5 |
| Distilled water | 53.5 |
| | 100.0 |

(2) The active substance was dissolved in water and then impregnated on attaclay granules. In a dosage of 40 kgs. of active substance per ha. a cover of 4 granules per cm.² was obtained.

| Composition: | Percent |
| --- | --- |
| Active substance | 15.0 |
| Water | 18.3 |
| Attaclay granules, diameter 0.5–2 mm | 66.7 |
| | 100.0 |

(3) These granules were likewise formulated on an attaclay basis but after impregnating the active substance on the granules they were coated with a thin film of fatty alcohol. In a dosage of 40 kgs. of active substance per ha. a cover of approximately 4 particles per cm.² was obtained.

| Composition: | Percent |
| --- | --- |
| Active substance | 15.0 |
| Water | 18.3 |
| Attaclay granules, diameter 0.5–2 mm. | 64.2 |
| Fatty alcohols (commercial quality), consisting of 7–10% of myristyl alcohol, 43–45% of cetyl alcohol and 40–50% of stearyl alcohol | 2.5 |
| | 100.0 |

(4) The active substance was dissolved in water and then impregnated on dry coffee grounds. In a dosage of 40 kgs. per ha. a cover of 12 particles per m.² was obtained.

| Composition: | Percent |
| --- | --- |
| Active substance | 5.0 |
| Water | 10.0 |
| Dried coffee grounds, diameter 0.5–2 mm. | 85.0 |
| | 100.0 |

(5) A paste was prepared of the following composition:

| Composition: | Percent |
| --- | --- |
| Active substance | 40.0 |
| Mineral oil | 35.0 |
| Emulsifier, type alkyl phenol polyglycol ether, combined with alkyl aryl sulphonates | 5.0 |
| | 100.0 |

(6) A wettable powder prepared of the following composition:

| Composition: | Percent |
| --- | --- |
| Active substance | 75.0 |
| Mineral or soluble salts, for example urea | 22.5 |
| Surface-active substance | 2.5 |
| | 100.0 |

(7) A dust was prepared of the following composition:

| Composition: | Percent |
| --- | --- |
| Active substance | 20.0 |
| Talcum | 80.0 |
| | 100.0 |

(8) Granules were prepared of the following composition:

| Composition: | Percent |
| --- | --- |
| Active substance | 25.0 |
| Sulfide lye powder | 10.0 |
| Water | 5.0 |
| Dolomite | 60.0 |
| | 100.0 |

The preparation according to the invention can be introduced into the soil in different manners.

According to one method a composition in a finely divided form is distributed on the soil which is then dug up, harrowed or ploughed. For most purposes cultivation to a depth of from 10 to 50 cms. is sufficient. In a rainy period the mechanical cultivation of the soil may be omitted and it may be left to the influence of the rainwater to introduce the active substance deeper into the soil. As a rule it is not necessary to repeat the whole treatment but, if desired, another quantity of from 10 to 80 kg. of active substance per hectare may be introduced into the soil after a few weeks. It has not been found that damage of any significance is done in this manner to a vegetation which has come up in the meantime.

According to another method, a composition containing the active compound is introduced only into the rows or furrows destined for sowing or planting the vegetation. In this manner inactivation of the nematodes over the total surface of the soil is not obtained, it is true but since the rate of displacement of the organisms is comparatively small, a protection against the nematode activity can nevertheless be obtained in this manner at the places where this is desired.

According to the invention, the active compounds may alternatively be mixed with other pesticidal compositions, notably soil fungicides, for example, chloropicrin, tetra methyl-thiourea disulphide pentachloronitrobenzene, zineb, maneb, 8-hydroxyquinolein, organic tin and mercury compounds, triphenyl tin hydroxide or the acetate or butyrate thereof, furthermore the sodium salt of mono-methyl-dithiocarbamic acid in addition with soil insecticides, for example, chlorinated hydrocarbons (dieldrin, endrin, toxaphen and hexachlorocyclohexane) in addition with other known nematicides, for example, a mixture of 1,2-dichloropropane and 1,3 - dichloropropene, sodium - N - methyl dithio carbamate or 1,2 dibromo-3-chloro-propane. Finally, the active substances or the compositions to be prepared therefrom may alternatively be mixed with artificial fertilisers, for example, phosphates.

Example 1

80 g. of 4 chloro-pyridine-N-oxide were mixed according to prescription nr. 1 with 2.6 gs. of alkylarylpolyglycol ether ("Triton-X 114") and 96 gs. of water. The composition was further diluted with water to 80 l.

Three other solutions were prepared in exactly the same manner with only the quantity of 4-chloro-pyridine-N-oxide differing. The quantities were 40, 20 and 0 g. (blank) respectively.

Each solution was evenly sprayed on separate follow plots of 10 sq.m. each. According to samples, the soil was infected with Meloidogyne incognita var. acrita (on an average of 1500 larvae per 500 gs. of soil). The degree of infection was substantially the same for all the plots. Immediately after spraying each plot was ploughed to a depth of 25 cm. One week after the treatment of the soil young tomato plants (var. Bonny Best) were planted (approximately 8 cms. high) on each plot.

10 weeks after planting the weight of the plants and the degree of root gallformation were determined.

On the plots where a solution containing 4 chloro-pyridine-N-oxide was sprayed, substantially no root gall formation was found in contrast with the control plot where the root systems were badly infested.

In the plots treated with the combating agents the average weight of the plants were found to be 16-40% higher compared with that of the control plot. No phytotoxicity was observed with these dosages.

Example 2

4-chloro-pyridine. HCl-salt.—Units of 1 kg. of soil infested with Meloidogyne incognita var. acrita were mixed with 25, 6¼ and 0 mg. of 4-chloro-pyridine. HCl-salt respectively dissolved in 20 mls. of water. The units of treated soil were then transferred to glass one-litre plots and stored, while sealed, for one week at a temperature of approximately 22° C. After this period the units of soil were transferred to plastic pouches which were likewise stored for one week while sealed at a temperature of approximately 22° C. The pouches containing the soil were then dug in a trench (27° C.) and planted with young tomato plants (approximately 8 cms. high). 6 weeks after planting the root infestation and phytotoxicity were determined.

RESULTS

| | | | |
|---|---|---|---|
| Dosage in mgs. per kg. of soil [1] | 25 | 6¼ | 0 |
| Average root infestation [2] | 0.0 | 1.3 | 5.0 |
| Phytotoxicity | None | None | None |

[1] 25 mgs./kg. of soil corresponds to a dosage of 78 kgs. of active compound per hectare.
[2] 0=No root galls; 1=1-5 root galls per root systems; 2=5-10 root galls per root system; 3=30-40% of the roots covered with root galls; 4=40-80% of the roots covered with the root galls; 5=80-100% of the roots covered with root galls.

Example 3

A solution of 4-chloro-pyridine-N-oxide in water was brought on a plot according to the composition stated in prescription 1 in a quantity corresponding to 40 kgs. of active substance per ha. The soil was ploughed to 30 cm. depth and then planted with young maize plants.

After 16 weeks a reduction of the Pratylenchus population in the roots of the maize plants with respect to control experiments of well over 90% was found.

Example 4

A solution of 25 gs. of 4-brome-pyridine. HCl-salts in 20 mls. of water was introduced into the soil in a quantity corresponding to approximately 80 kgs. per ha. according to the experimental set-up of Example 2. At the end of the experimental period, only a comparatively low root infestation was found.

What is claimed is:

1. A method for controlling nematodes which comprises applying to said nematodes a nemotocidally effective amount of a 4-halopyridine compound selected from the group consisting of the 4-halopyridine compounds of the formulae

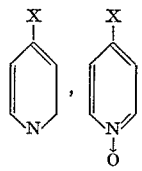

wherein X represents a member of the group consisting of chloro and bromo and the acid addition salts thereof with an acid selected from the group consisting of hydrochloric, sulfuric, nitric and phosphoric acids.

2. The method claimed in claim 1 wherein the 4-halopyridine compound is 4-bromopyridine.

3. The method claimed in claim 1 wherein the 4-halopyridine compound is 4-chloropyridine.

4. The method claimed in claim 1 wherein from 10 to 80 kg. per ha. of the 4-halopyridine compound is employed.

5. The method of claim 1 wherein the 4-halopyridine compound is 4-chloro-pyridine-hydrochloride.

6. The method of claim 1 wherein the 4-halopyridine compound is 4-chloro-pyridine-N-oxide.

7. The method of claim 6 wherein the 4-chloro-pyridine N-oxide is introduced into a nematode infested soil in the form of a finely divided solid or liquid composition containing 5-80% by weight of the 4-chloro-pyridine N-oxide.

8. The method of claim 7 wherein the 4-chloro-pyridine-N-oxide containing composition is homogeneously distributed over the soil and then introduced into the soil by digging, harrowing or plowing the soil to a depth of 10-50 cm.

9. The method of claim 8 wherein any new planting or sowing is delayed for at least 5 days.

References Cited

UNITED STATES PATENTS

| | | | |
|---|---|---|---|
| 2,809,971 | 10/1957 | Bernstein et al. | 167—33 |
| 3,105,005 | 9/1963 | Cannon et al. | 167—33 |
| 3,211,679 | 10/1965 | Updegraff | 167—33 |
| 3,346,578 | 10/1967 | Langlykke et al. | 167—33 |

OTHER REFERENCES

CIBA Ltd., "Pesticidal Pyridine Derivatives" (1965), CA 64, p. 5050 (1966).

Britton: "Pyridinium Quaternary Ammonium Compounds" (1952), CA 47, p. 10558 (1953).

JEROME V. GOLDBERG, Primary Examiner

PO-1050
(5/69)

UNITED STATES PATENT OFFICE
CERTIFICATE OF CORRECTION

Patent No. __3,657,444 (PHN 723)__ Dated __April 18, 1972__

Inventor(s) __MARTIN JACOB HANDELE ET AL__

It is certified that error appears in the above-identified patent and that said Letters Patent are hereby corrected as shown below:

Column 1, line 9, after "6,502,006" insert --

, application Netherlands, April 24, 1965, 6,505,269 --.

Signed and sealed this       day of            1972.

Signed and sealed this 24th day of April 1973.

(SEAL)
Attest:

EDWARD M. FLETCHER, JR.          ROBERT GOTTSCHALK
Attesting Officer                Commissioner of Patents